(12) United States Patent
Griffin

(10) Patent No.: US 9,377,807 B2
(45) Date of Patent: Jun. 28, 2016

(54) MAGNETIC CONNECTOR

(71) Applicant: Research In Motion Limited, Waterloo (CA)

(72) Inventor: Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 322 days.

(21) Appl. No.: 13/789,976

(22) Filed: Mar. 8, 2013

(65) Prior Publication Data

US 2014/0254077 A1    Sep. 11, 2014

(51) Int. Cl.
G06F 1/16    (2006.01)
H05K 5/00    (2006.01)
H05K 7/00    (2006.01)

(52) U.S. Cl.
CPC .............. *G06F 1/16* (2013.01); *G06F 1/1654* (2013.01); *G06F 1/1669* (2013.01); *G06F 1/1675* (2013.01); *G06F 1/1681* (2013.01)

(58) Field of Classification Search
USPC ................................................. 335/219, 285
See application file for complete search history.

(56) References Cited

U.S. PATENT DOCUMENTS

| | | | |
|---|---|---|---|
| 6,370,701 B1 | 4/2002 | Siegrist | |
| 6,832,100 B2 | 12/2004 | Hsieh | |
| 7,961,977 B2 | 6/2011 | Tanaka | |
| 8,159,834 B2 | 4/2012 | Griffin et al. | |
| 8,344,836 B2 * | 1/2013 | Lauder et al. .................. | 335/219 |
| 2007/0103266 A1 * | 5/2007 | Wang et al. .................... | 335/285 |
| 2007/0133156 A1 * | 6/2007 | Ligtenberg ............ | G06F 1/1616 361/679.27 |
| 2007/0138806 A1 * | 6/2007 | Ligtenberg et al. ........ | 292/251.5 |
| 2008/0174392 A1 * | 7/2008 | Cho ............................... | 335/285 |
| 2008/0278269 A1 * | 11/2008 | Ramirez et al. ............... | 335/205 |
| 2010/0123663 A1 | 5/2010 | Leung et al. | |
| 2010/0238620 A1 | 9/2010 | Fish | |
| 2011/0026203 A1 * | 2/2011 | Ligtenberg .............. | E05C 19/16 361/679.01 |
| 2012/0068942 A1 * | 3/2012 | Lauder ...................... | H01F 7/04 345/173 |
| 2012/0300383 A1 * | 11/2012 | Lauder .................. | G06F 1/1647 361/679.26 |
| 2013/0170126 A1 * | 7/2013 | Lee ........................ | G06F 1/1654 361/679.17 |
| 2013/0279096 A1 * | 10/2013 | Gengler .................... | H05K 7/00 361/679.01 |

FOREIGN PATENT DOCUMENTS

| | | |
|---|---|---|
| EP | 2487877 A1 | 8/2012 |
| WO | 2005/026823 A2 | 3/2005 |
| WO | 2012/106215 A2 | 8/2012 |

OTHER PUBLICATIONS

Extended European Search Report from related European Patent Application No. 13158435.1 dated Aug. 1, 2013; 8 pages.

* cited by examiner

*Primary Examiner* — Tuan T Dinh

(74) *Attorney, Agent, or Firm* — Jon Gibbons; Fleit Gibbons Gutman Bongini & Bianco P.L.

(57) ABSTRACT

An apparatus has a first housing and a second housing. By one approach at least the second housing has at least one exterior edge configured as a pivot surface. The first housing includes at least a first magnet and the second housing includes at least a second magnet that is disposed proximal to the aforementioned pivot surface. So configured, the first and second magnet interact with one another and thereby serve as a magnetic connector such that the first housing pivots with respect to the second housing about the pivot surface. By one approach, the first and second housing do not pivotally connect to one another via a mechanical connector.

18 Claims, 5 Drawing Sheets

MAGNETIC CONNECTOR

FIELD OF TECHNOLOGY

The present disclosure relates to connectors and more particularly to connectors used to pivotally couple two housings to one another.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), gaming consoles, tablets, netbooks and laptop computers with wireless 802.11 or Bluetooth® capabilities.

Portable electronic devices such as PDAs or smart telephones are generally intended for handheld use and ease of portability. Smaller devices are generally desirable for portability. In many cases such devices include a pair of housings that couple to one another and that move relative to one another between, for example, a closed (or stowed) configuration and an opened (or deployed) configuration. By one approach, for example, a first such housing may include a display while a second such housing may include a keyboard.

Many such devices employ one or more mechanical connectors to connect one such housing to another. So configured, the two housings can pivot with respect to one another about the connector(s). While useful for many purposes, physical, mechanical connectors are not necessarily fully satisfactory for all application settings and users. Not only can a mechanical coupling give rise to design limitations, but also it can restrict the physical manipulability of the resultant device to only a very specific configuration.

DETAILED DESCRIPTION

Figure 1:
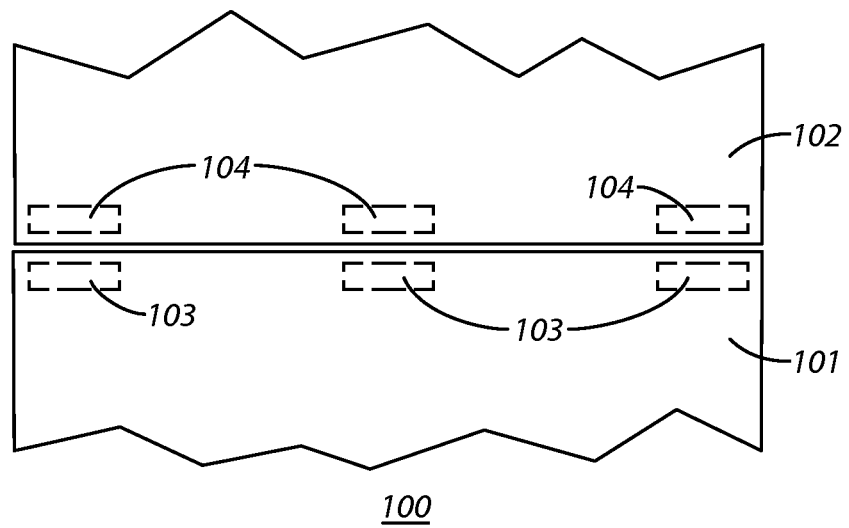
FIG. 1 is a top plan detail view in accordance with the disclosure.

The following describes an apparatus having a first housing and a second housing. By one approach at least the second housing has at least one exterior edge configured as a pivot surface. The first housing includes at least a first magnet and the second housing includes at least a second magnet that is disposed proximal to the aforementioned pivot surface. So configured, the first and second magnet interact with one another and thereby serve as a magnetic connector such that the first housing pivots with respect to the second housing. By one approach, the first and second housings do not pivotally connect to one another via a mechanical connector. Accordingly, the magnetic connector described herein is devoid of any physical linkage component. As a result, the first and second housings are mechanically disjoint.

The present teachings are highly flexible in practice. For example, the aforementioned housings can have a variety of form factors and can accommodate all manner of circuitry or the like. By one approach, for example, the first housing includes a keyboard (such as, if desired, an alphanumeric QWERTY-style keyboard) and the second housing has a display. Many other variations are possible.

As another example of the flexibility of these teachings, the first housing has at least one exterior edge that is also configured as a pivot surface. So configured, for example, the pivot surface of the first housing can engage the pivot surface of the second housing when one housing pivots with respect to the other.

The specific form and configuration of the aforementioned pivot surface can vary with the application setting. By one approach the pivot surface can comprise a half bullnose edge formed along the corresponding exterior edge of the respective housing. By another approach the pivot surface comprises an exterior edge having a first edge portion that comprises a right-angle edge and a second edge portion that is disposed at about a forty-five degree angle to the right-angle edge.

By one approach, to the extent that a given one of the two housings has a pivot surface formed along a given exterior edge thereof, these teachings will also accommodate providing the opposing exterior edge of that same housing with a pivot surface as well. Suitably configured in this manner it then becomes possible for the first housing to selectively pivot with respect to either of two opposing edges of the second housing. Such flexibility, of course, is generally unavailable when employing mechanical connectors.

The aforementioned magnets can be disposed within and/or on the corresponding housing as desired. By one approach the individual magnets are disposed within the respective housing such that the resultant strength of the magnetic field is essentially the same around a given corresponding edge of the housing. By another approach one or more of the individual magnets can be non-centrally located in order to provide portions of the edge that have magnetic fields of greater and lesser strength. The latter approach can serve, for example, to make it easier in some configurations to break the magnetic connection and temporarily move one housing apart from the other.

So configured, and by way of an illustrative example, a laptop-style keyboard and display can be folded into a stowed configuration with the display facing the keyboard. The display portion can then be pivoted away from the keyboard to a desired position. By one approach, the display can continue to pivot rearwardly until the display portion is back-to-back with the keyboard. By another approach, the display and keyboard can be separated from one another to facilitate repositioning these components in some other desired way (such as, for example, with the two components again assuming a folded-laptop configuration only with the display facing to the exterior and with the keyboard being disposed under the display and facing into the backside of the display portion).

Magnetic connectors, employed in the absence of any mechanical connectors, provide an opportunity for convenient yet reliable manipulation by a user. Such an approach can be cost effective and can also yield a longer-lived end product whose useful lifetime is not ultimately determined by when a mechanical connector fails. The present teachings will also support component configurations that are not readily attainable using mechanical connectors.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a dual-housing apparatus 100 having a first housing 101 and a second housing 102. Both the first and second housings 101 and 102 have a plurality of magnets 103 and 104, respectively, disposed therein. Any of a variety of magnetic materials can be so employed as desired including, if desired, one or more electromagnets. These teachings will also readily accommodate using a variety of different magnets ("different" in terms of their size, shape, and/or material composition) if so desired.

In this example it is presumed that the magnets 103 and 104 all have a cylindrical shape and that their respective magnetic polarity is laterally oriented rather than longitudinally oriented. These magnets 103 and 104 are all located relatively close to at least one exterior edge of each of the housings 101 and 102. In this example, the magnets 103 for the first housing 101 are oriented with a same pole (such as the north pole) facing towards the second housing 102. Conversely, the magnets 104 for the second housing 102 are oriented with a different pole (i.e., in this example, the south pole) facing towards the first housing 101.

So configured, the magnets 103 of the first housing 101 and the magnets 104 of the second housing 102 will mutually attract one another rather than repel one another and hence will serve to urge the first housing 101 and the second housing 102 into an aligned juxtaposition with respect to one another. (For the sake of clarity and illustration, in some cases these figures may present the housings 101 and 102 as being slightly separated from one another. In a physical embodiment, however, the two housings 101 and 102 likely abut one another at one or more points of contact.)

Though juxtaposed as described and in physical contact with one another, the first and second housing 101 and 102 are not pivotally connected to one another via a mechanical connector. Instead, and as will be described herein, these two housings 101 and 102 pivot with respect to one another via and about the aforementioned magnets 103 and 104 interacting with one another as a magnetic connector. That said, with sufficient applied force the attraction between these magnets 103 and 104 can be overcome to permit the first housing and the second housing 102 to be separated from one another. Appropriate uses of this characteristic are described herein as well.

Figure 2:
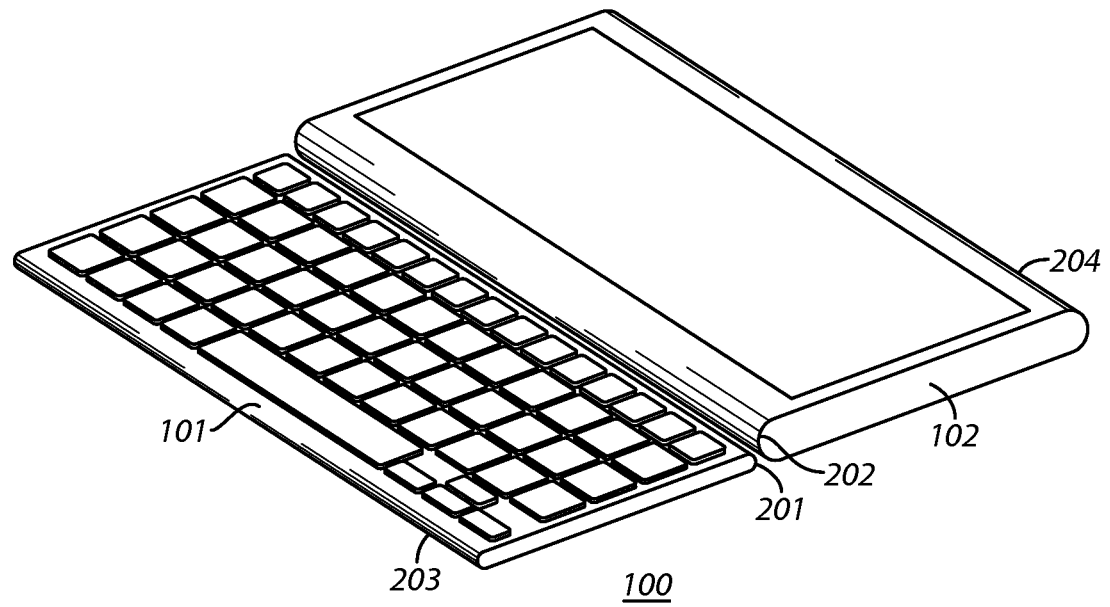
FIG. 2 is a perspective view in accordance with the disclosure.

FIG. 2 presents one approach in these regards where the first and second housings 101 and 102 both comprise substantially planar components. In this particular example the first housing 101 includes a keyboard and the second housing includes a display (which may, or may not, comprise a touch-sensitive screen as desired). In this example opposing side edges (i.e., the edges denoted by reference numerals 201 and 203 for the first housing 101 and the edges denoted by reference numerals 202 and 204 for the second housing 102) are configured as a pivot surface.

In particular, but without intending any particular limitations in these regards, these pivot surfaces comprise half bullnose edges. Accordingly, viewed in cross section, these pivot surfaces are one-half of a circle. (As used herein, the expression "pivot surface" will be understood to refer to a surface on a first body upon which a second body makes contact and over which the second body moves when the second body pivots with respect to the first body.)

The aforementioned magnets 103 and 104 are disposed within these housings 101 and 102 (respectively) in close proximity to the above-described edges 201-204. So configured, a first edge 201 of the first housing 101 will be urged towards a first edge 202 of the second housing 102 by virtue of the corresponding magnetic attraction. Notwithstanding that magnetic attraction, however, these two housings 101 and 102 can pivot with respect to one another. This pivoting capability, in turn, permits (for example) a user to "close" the apparatus 100 by pivoting the second housing 102 forward to lie atop the first housing 101.

As used herein the expression "pivot surface" will be further understood to not merely comprise an edge wholly consisting of a flat surface (oriented, for example, perpendicular to the housing itself). That said, however, it will also be understood that these teachings do not necessarily require that both housings (nor multiple edges for any given housing) having an edge configured as a pivot surface; instead, only one of the housings (and/or only one edge of the housings) need have an exterior edge configured as a pivot surface.

Figure 3:
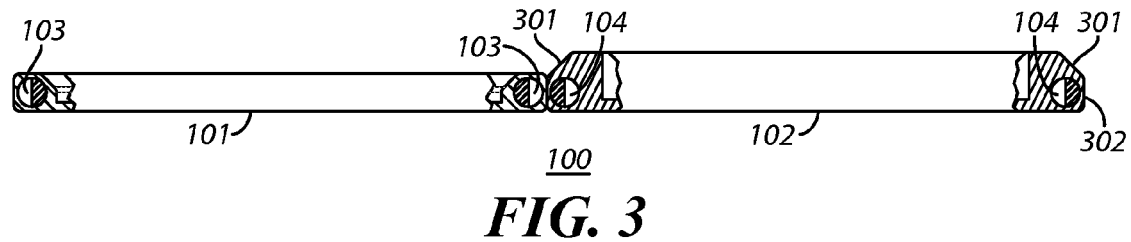
FIG. 3 is a side elevational view in accordance with the disclosure.
Figure 4:
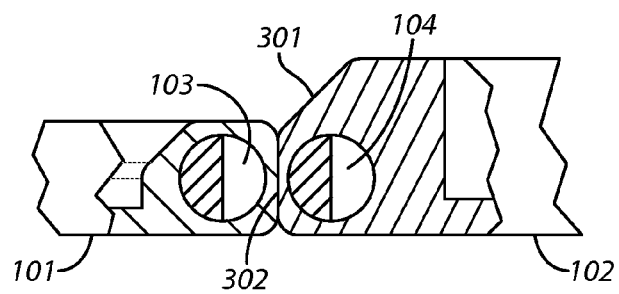
FIG. 4 is a side elevational detail view in accordance with the disclosure.

In the example provided above the pivot surface comprised the rounded surface of the described exterior edges 201-204. These teachings will readily accommodate other approaches in these regards. FIGS. 3 and 4 present one such example. In this example the second housing 102 has opposing exterior edges that include a first edge portion 302 that comprises a right-angle edge (relative to the top and bottom surfaces of the housing) and a second edge portion 301 that is disposed at about a forty-five degree angle with respect to the right-angle edge. Accordingly, these edge portions 301 and 302 comprise in combination a pivot surface about which the edges of the first housing 101 can move while pivoting.

In this illustrative example the embedded magnets 103 and 104 are shown with half of each magnet appearing with crosshatching. This crosshatching serves to generally denote the north pole of each magnet 103 and 104.

Also in this illustrative example (and referring perhaps in particular to FIG. 4) the magnets 103 for the first housing 101 are disposed centrally with respect to the edge, top, and bottom thereof (that is, essentially equidistant from each of the foregoing at the closest point). As a result, the magnetic fields for these magnets 103 are relatively equal on opposing sides of the first housing 101 at any given point.

Conversely, the magnets 104 for the second housing 102 are eccentric and offset in these regards. In particular, these magnets 104 are disposed closer to the bottom surface of the second housing 102 (in this view) than to the top surface thereof. Accordingly, the corresponding magnetic field will be somewhat weaker on the top surface of the second housing 102 than at a comparable opposing point on the bottom surface thereof.

Figure 5:
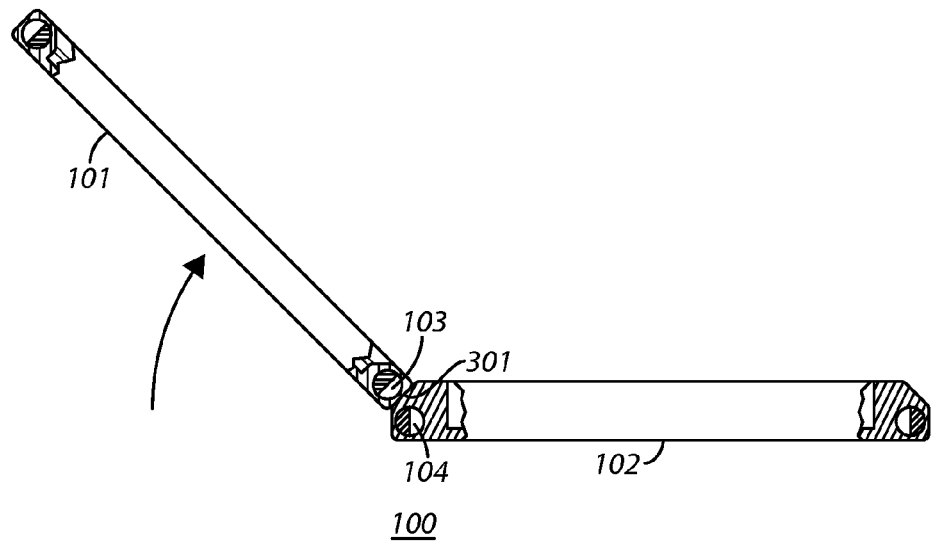
FIG. 5 is a side elevational view in accordance with the disclosure.
Figure 6:
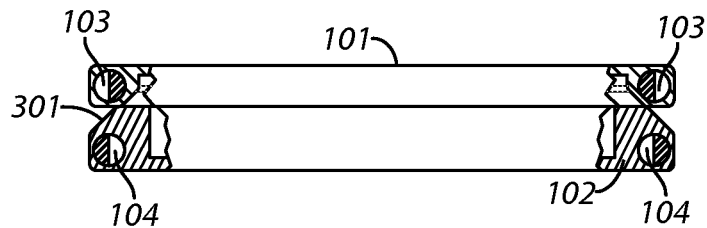
FIG. 6 is a side elevational view in accordance with the disclosure.
Figure 7:
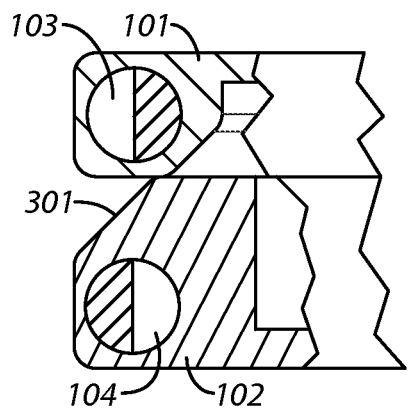
FIG. 7 is a side elevational detail view in accordance with the disclosure.

So configured, and as before, the magnets 103 and 104 will urge the two housings 101 and 102 towards one another while also permitting the two housings to be selectively and readily pivoted with respect to one another. FIG. 5 illustrates, for example, the first housing 101 pivoting upwardly and clockwise about the aforementioned pivot surface/magnetic connector. With reference to FIGS. 6 and 7, eventually the first housing 101 will come into contact with and essentially lie flush across and in alignment with the second housing 102.

In this particular configuration the keyboard and display are facing inwardly towards one another. It will also be noticed that the first housing 101 is held in this closed position with respect to the second housing 102 by pairs of magnets 103/104 on both opposing sides of the apparatus 100. Accordingly, the magnets 103 and 104 also serve, in this configuration, as a latching mechanism to hold the apparatus 100 in the illustrated closed state.

As shown perhaps best in FIG. 7, although the magnets 103 for the first housing 101 are now rotated 180 degrees from their original orientation shown in FIG. 3, these magnets 103 are now also rotationally translated by 90 degrees with respect to the magnets 104 of the second housing 102. Accordingly, these magnets 103 and 104 are disposed such that the north poles of one are relatively closer to the south poles of the other, hence preserving the efficacy of the corresponding magnetic attraction.

In this particular illustrative example, however, the magnets 103 and 104 are positioned further apart from one another than as shown in FIG. 3 due to the offset positioning of the magnets 104 in the second housing 102. For all the foregoing reasons, then, the strength of the magnetic force between respective pairs of magnets 103 and 104 will be less than for the same magnet pairs shown in FIG. 3. Accordingly, the magnetic bond is more easily broken and hence it can be relatively simple for the user to "unlatch" the one housing from the other when manipulating the apparatus 100 to open it.

Figure 8:
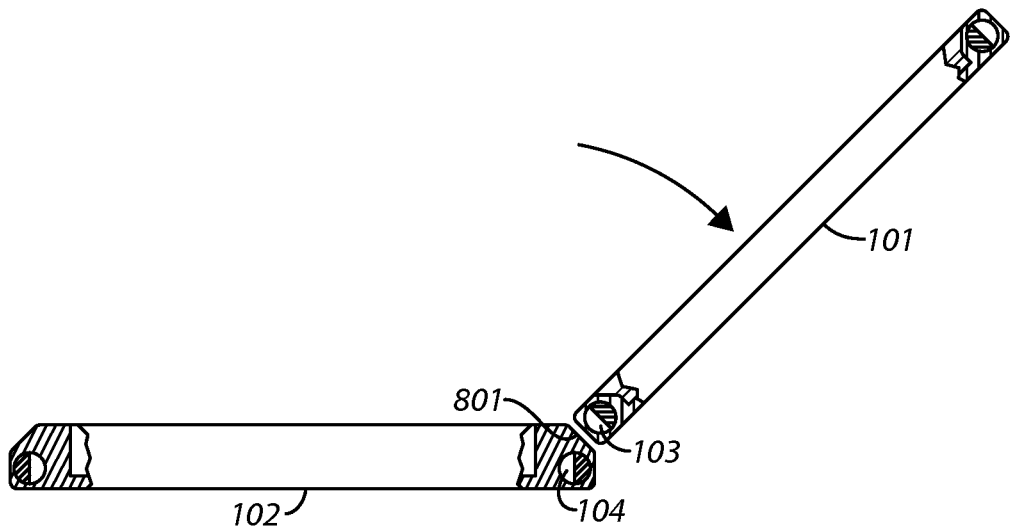
FIG. 8 is a side elevational view in accordance with the disclosure.
Figure 9:
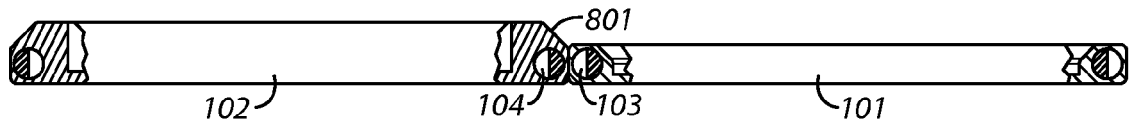
FIG. 9 is a side elevational view in accordance with the disclosure.
Figure 10:
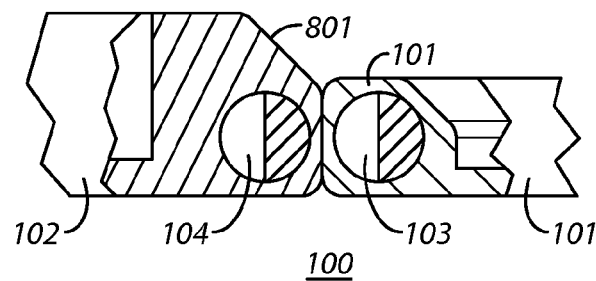
FIG. 10 is a side elevational detail view in accordance with the disclosure.

FIG. 8 illustrates that that upon breaking that magnetic latch the first housing 101 can continue to pivot in the clockwise direction by now pivoting about the second edge portion 801 on the external edge that is opposite the previously-described second edge portion 301. As shown in FIGS. 9 and 10 this rotation can continue until the first housing 101 is again coplanar with the second housing 102. It will be noted that although the first housing 101 is now on the opposite side of the second housing 102, both the display and the keyboard are again facing upwardly. Such a transformation can be convenient to a given user in a particular application setting for any of a variety of reasons.

Figure 11:
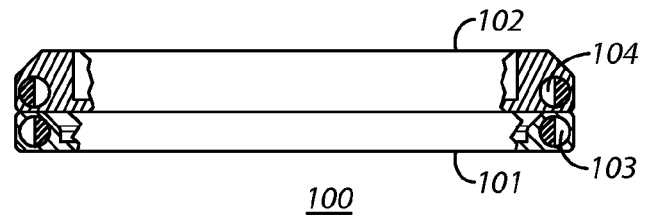
FIG. 11 is a side elevational view in accordance with the disclosure.
Figure 12:
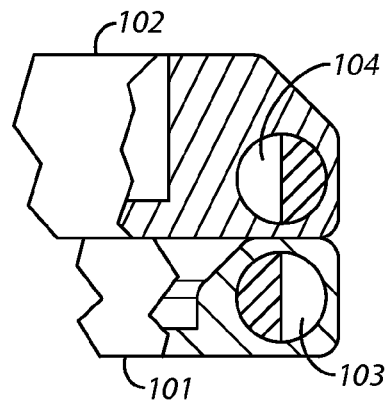
FIG. 12 is a side elevational detail view in accordance with the disclosure.

As mentioned above, by breaking the magnetic bond between the first housing 101 and the second housing 102 at any point the two housings 101 and 102 can be physically separated from one another. This configuration, in turn, offers additional opportunities regarding how these two components can be juxtaposed with respect for one another. As one example in these regards, by disconnecting the first housing 101 from the second housing 102 the first housing 101 can be disposed, face up, on the underside of the second housing as shown in FIGS. 11 and 12. So configured, the keyboard is now stowed between the two housings 101 and 102 and is protected both from damage and false-triggering events. Such a configuration may be useful, for example, when looking to employ the apparatus 100 as a touch-sensitive tablet having a relatively small footprint.

Figure 13:
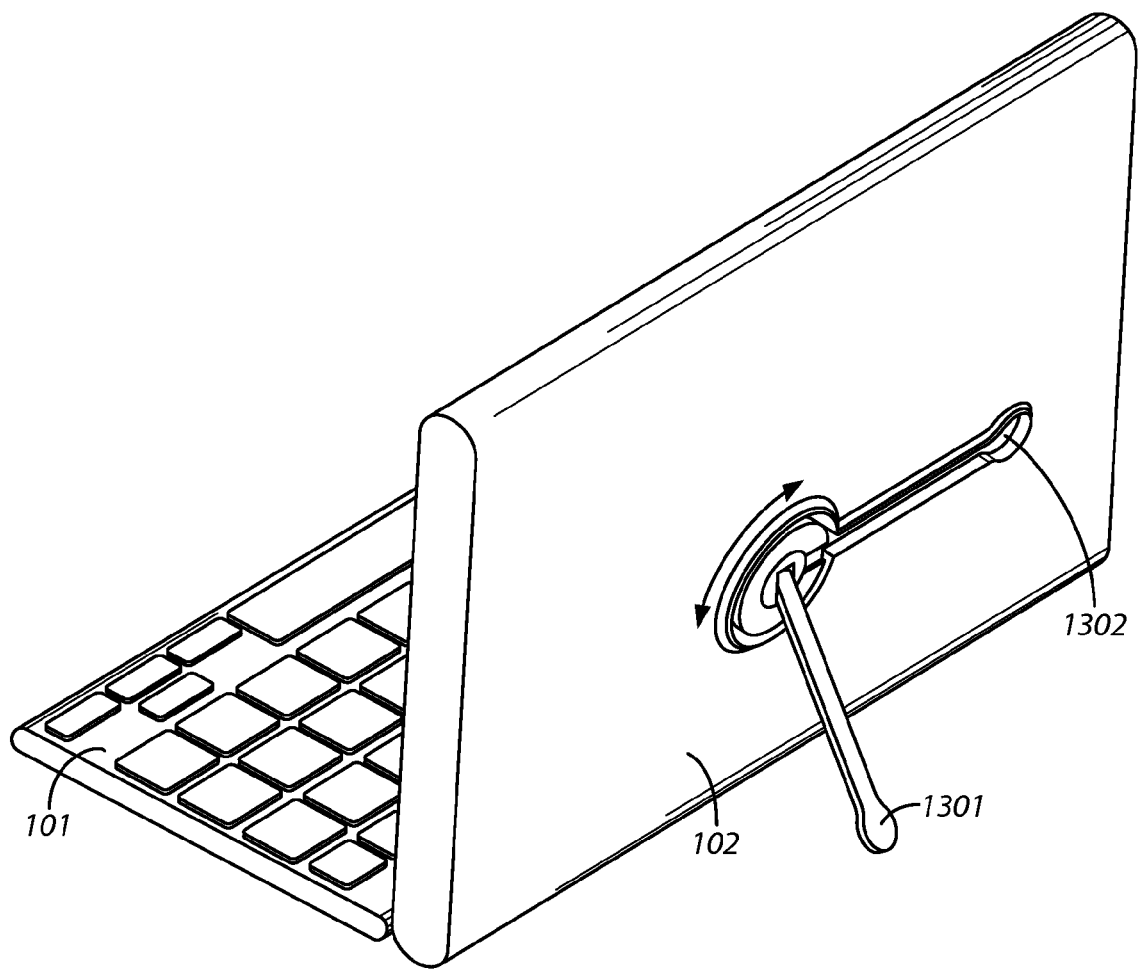
FIG. 13 is a rear perspective view in accordance with the disclosure.

The strength, number, and specific positioning of the magnets 103 and 104 will influence or even determine in some cases whether either housing 101 and 102 can be maintained at a particular angle with respect to the other. If desired, one or both housings 101 and 102 can also include a stand to aid in maintaining the corresponding housing at a desired position/angle. FIG. 13 presents one illustrative example in these regards. In this example the second housing 102 includes a kickstand-like stand 1301 that can be selectively removed from a corresponding nesting cavity 1302 and then rotated and/or angled outwardly by hand to a desired position. Those skilled in the art will recognize that there are numerous possibilities in these regards and that no particular limitations are intended by way of the specifics of this example.

So configured, a multi-housing apparatus can have one or more of its housings be selectively pivotally movable about another housing with respect to one or more pivot surfaces notwithstanding the lack of any mechanical connectors or the like. The absence of mechanical connectors, in turn, provides a simplified (and more aesthetically pleasing) exterior profile for the apparatus. Avoiding mechanical connectors can also help to ruggedize the apparatus and render the apparatus less susceptible to damage from undue impact with other surfaces and objects. A lack of mechanical connectors also makes it easier to configure the various housings of the apparatus in ways that require momentary physical separation between the housings. Those skilled in the art will also appreciate that these teachings greatly support and facilitate a modular approach to housing designs as well as facilitating the interchangeability of housings if desired.

In many cases one or more components of the first housing 101 will need to communicate with one or more components of the second housing 102. To avoid the use of physical communication pathways (such as electrically-conductive or optically-transmissive wires/fibers) the apparatus 100 can include one or more wireless data paths to communicatively couple the two housings 101 and 102. Examples include free-space optical links and any of a variety of radio-frequency-based methodologies (including but not limited to: Bluetooth® compatible transmissions protocols, a near-field transmission approach of choice, and so forth).

The presence of magnets in these housings can also be leveraged in other ways if desired. For example, the making or breaking of a given magnetic connection can be sensed and can serve to trigger a corresponding action. As one illustrative example in these regards, a particular predetermined application can launch as an automatic response in these regards. As another example, these magnets can serve, at least in part, to help the two housings automatically self-align their sides with one another such that the left sides of both housings are at least substantially co-linear and co-terminal with one another, as are the right sides of both housings.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

I claim:

1. An apparatus comprising:
   first and second housing housings each defining front and back opposed surfaces, a distal peripheral edge located at a mutual end of the front and back opposed surfaces, a proximal peripheral edge located at an opposite non-adjacent mutual end of the front and back surfaces relative to the distal peripheral edge, the distal peripheral edge defining a first pivot surface:

the second housing not being pivotally connected to the first housing via a mechanical connector;

each first pivot surface including a first magnet disposed within and extending along the first pivot surface, the first magnet fixed in an orientation with one pole facing in the direction of the proximal peripheral edge and the other pole facing in an opposite direction, both poles having a portion facing the front surface; the polar orientation of the first magnet in the first and second housings 180 degrees opposite with respect to each other; and wherein the first magnet of the first and second housings interact with one another as a magnetic connector such that the first housing pivots with respect to the second housing to change an orientation of the first magnets relative to each other during pivoting, the first magnets remaining magnetically attracted to each other while the first and second housings are pivoted from (a) an open position wherein the second housing is adjacent to and substantially coplanar with the first housing, to (b) a closed position wherein the front surface of the second housing lies atop the first housing with the front surfaces of the first and second housings facing inwardly towards one another, the respective first magnet urging the first and second housings towards one another while also permitting the two housings to be selectively pivoted with respect to one another, in which position opposite poles of both poles of the respective first magnets face each other and attract each other;

wherein the distal peripheral edge of at least one of the first and second housings comprises a half bullnose edge.

2. The apparatus of claim 1 wherein the first housing and the second housing both comprise substantially planar components.

3. The apparatus of claim 1 wherein the first housing includes a keyboard.

4. The apparatus of claim 1, wherein the first and second housings each have a second magnet disposed within the proximal peripheral edge.

5. The apparatus of claim 1, wherein at least one of the distal peripheral edges of the first and second housings has a first edge portion that comprises a right-angle edge and a second edge portion that is disposed at about a forty-five degree angle to the right-angle edge.

6. The apparatus of claim 3 wherein the keyboard comprises an alphanumeric keyboard.

7. The apparatus of claim 4,
wherein the respective second magnet of the first and second housings interact with one another as a magnetic connector when the first housing pivots with respect to the second housing about a pivot surface defined by the proximal peripheral edges of the first and second housings.

8. An apparatus comprising:
first and second housings each defining front and back opposed surfaces,
a distal peripheral edge located at a mutual end of the front and back opposed surfaces, a proximal peripheral edge located at an opposite non-adjacent mutual end of the front and back surfaces relative to the distal peripheral edge, the distal peripheral edge defining a first pivot surface;

the second housing not being pivotally connected to the first housing via a mechanical connector;

each first pivot surface including a first cylindrically shaped magnet disposed within and extending along the first pivot surface, the first magnet fixed in an orientation with one pole facing in the direction of the proximal peripheral edge and the other pole facing in an opposite direction, both poles having a portion facing the front surface; the polar orientation of the first magnet in the first and second housings 180 degrees opposite with respect to each other; and wherein the first magnet of the first and second housings continuously magnetically attract one another along the respective first pivot surfaces to maintain the proximal peripheral edges of the first and second housings together as the second housing is pivoted about the first pivot surface of the second housing through 180 degrees while an orientation of the first magnets relative to each other is changed during pivoting;

wherein the distal peripheral edge of at least one of the first and second housings comprises a half bullnose edge.

9. The dual-housing electronic device of claim 8, wherein the first housing comprises a first substantially-planar housing and the second housing comprises a second substantially-planar housing.

10. The device of claim 8, the cylindrically shaped magnet having a longitudinal shape defining a longitudinal axis, the magnets disposed within the housing with the longitudinal axis aligned parallel to the respective exterior edge of the housing, the magnetic poles extending laterally along the axis of the magnet.

11. The device of claim 8, wherein at least one of distal and proximal peripheral edges forms an angled pivot surface.

12. The apparatus of claim 8, wherein when either the front surfaces of the first and second housings are parallel and facing each other, or the back surfaces of the first and second housings are parallel and facing each other, opposite poles of both poles of the respective first magnets face each other and attract each other.

13. The apparatus of claim 8, wherein the first and second housings each have a second magnet disposed within the proximal peripheral edge.

14. The apparatus of claim 8, wherein at least one of the distal peripheral edges of the first and second housings has a first edge portion that comprises a right-angle edge and a second edge portion that is disposed at about a forty-five degree angle to the right-angle edge.

15. The apparatus of claim 8, wherein the first magnets of the first and second housings continuously magnetically attract one another along the respective first pivot surfaces to maintain the proximal peripheral edges of the first and second housings together as the second housing is pivoted about the first pivot surface of the second housing through 180 degrees.

16. The apparatus of claim 13, wherein the respective second magnet of the first and second housings interact with one another as a magnetic connector when the first housing pivots with respect to the second housing about a pivot surface defined by the proximal peripheral edges of the first and second housings.

17. The apparatus of claim 13, wherein the front of one of the first and second housings being disposed parallel to and facing the back of the other of the first and second housings, with the first and second magnets attracted to each other to maintain the first and second housings together.

18. An apparatus comprising:
first and second housings each defining front and back opposed surfaces, a distal peripheral edge located at a mutual end of the front and back opposed surfaces, a proximal peripheral edge located at an opposite non-adjacent mutual end of the front and back surfaces relative to the distal peripheral edge, the distal peripheral edge defining a first pivot surface, and the proximal peripheral edge defining a second pivot surface;

the second housing not being pivotally connected to the first housing via a mechanical connector; each first pivot surface including a first cylindrically shaped magnet disposed within and extending along the first pivot surface, the first magnet fixed in an orientation with one pole facing in the direction of the proximal peripheral edge and the other pole facing in an opposite direction, both poles having a portion facing each of the front and rear surfaces;

each second pivot surface including a second cylindrically shaped magnet disposed within and extending along the second pivot surface, the second magnet fixed in an orientation with one pole facing in the direction of the distal peripheral edge and the other pole facing in an opposite direction, both poles having a portion facing each of the front and rear surfaces; the polar orientation of the first magnet and the second magnet oriented 180 degrees opposite with respect to each other;

wherein the first magnets of the first and second housings continuously magnetically attract one another along the respective first pivot surfaces to maintain the proximal peripheral edges of the first and second housings together as the second housing is pivoted about the first pivot surface of the second housing through 180 degrees while an orientation of the first magnets relative to each other is changed during pivoting; and wherein the first magnets mutually separate-ably, and the second magnet of the first and second housings continuously magnetically attract one another along the respective second pivot surfaces to maintain the distal peripheral edges of the first and second housings together as the second housing is pivoted about the second pivot surface of the second housing through 180 degrees;

wherein the distal peripheral edge of at least one of the first and second housings comprises a half bullnose edge.

\* \* \* \* \*